United States Patent [19]

Kopp

[11] Patent Number: 4,699,433
[45] Date of Patent: Oct. 13, 1987

[54] CENTERING ARRANGEMENT FOR A WHEEL HUB

[75] Inventor: Hans Kopp, Uhwiesen, Switzerland

[73] Assignee: Georg Fischer Aktiengesellschaft, Schaffhausen, Switzerland

[21] Appl. No.: 824,441

[22] Filed: Jan. 31, 1986

[30] Foreign Application Priority Data

Jan. 31, 1985 [CH] Switzerland ............................ 427/85

[51] Int. Cl.⁴ .............................................. B60B 27/00
[52] U.S. Cl. ................................. 301/6 S; 301/105 R
[58] Field of Search ............... 301/6 S, 10 R, 11 R, 301/24, 62, 63 R, 65, 105 R, 10 DC, 6 R, 6 WB

[56] References Cited

U.S. PATENT DOCUMENTS

| | | | |
|---|---|---|---|
| 1,966,826 | 7/1934 | Miller | 301/105 R X |
| 2,272,889 | 2/1942 | Brink | 301/24 |
| 2,507,876 | 5/1950 | Ash | 301/105 R X |
| 2,812,216 | 11/1957 | Hykes et al. | 301/105 R |
| 3,361,117 | 1/1968 | Fawick | 301/11 R X |
| 4,470,637 | 9/1984 | Kopp et al. | 301/11 R |

Primary Examiner—David A. Scherbel
Assistant Examiner—Russell D. Stormer
Attorney, Agent, or Firm—Marmorek, Guttman & Rubenstein

[57] ABSTRACT

A centering arrangement for aligning a wheel hub with a brake drum is disclosed. The centering arrangement includes a wheel hub, a spoke portion of substantially three-dimensional, circumferential wave shape, and at least three centering pins. The centering pins are formed as ribbed elements and are disposed in a zone remote from the regions of stress occurring in the wheel hub during operative use. Preferably, the centering pins are disposed in the wave troughs of said spoke parts.

5 Claims, 3 Drawing Figures

CENTERING ARRANGEMENT FOR A WHEEL HUB

BACKGROUND OF THE INVENTION

The present invention relates to a mechanism for centering a wheel hub when it is mounted on the brake drum of a vehicle. More particularly, the present invention relates to a centering arrangement for a wheel hub wherein the centering arrangement includes at least three centering pins which align with the brake drum. The wheel rim includes a waveshaped spoke portion and the centering pins are disposed in the undulations of the spoke portion.

Centering arrangement of this kind may be classified into the field of lightweight machinings. An example of such a lightweight machining is described in U.S. Pat. No. 4,470,637, which was co-invented by the present inventor and is assigned to the present assignee. U.S. Pat. No. 4,470,637, which is incorporated herein by reference, discloses a vehicle wheel of the type that carries a tubed tire. The vehicle wheel of this patent includes a wheel body, a tire hub which has a plurality of segmental wheel parts, and means for safely retaining the tube tire on the tire rim.

In Swiss Patent Application No. 4476/83-7, a centering arrangement for a vehicle wheel is disclosed wherein individual centering pins are provided on the wheel hub. These individual centering pins are separated from each other on the perimeter of the wheel hub. The use of such individual centering pins helps prevent the formation of shrink holes in the wheel hub. Their use also results in a reduction in weight of the wheel hub.

However, the centering arrangement described in Swiss Patent Application No. 4476/83-7 suffers from the deficiency that there is a loss in strength or sturdiness in the regions of the centering pins. Thus, there is a tendency of such wheel hubs to fail when the vehicle is in operative use.

Accordingly, it is an object of the present invention to provide a centering arrangement for a wheel hub of a vehicle utilizing individual centering pins wherein the strength of the wheel hub is not reduced and the wheel hub is not subject to failure during operative use of the vehicle.

SUMMARY OF THE INVENTION

This and other objects are accomplished by means of the present invention which provides a centering arrangement for use in conjunction with a wheel hub to be mounted concentrically on the brake drum of a vehicle. The centering arrangement includes a central portion of a wheel hub, an outer spoke portion attached to the central portion of the wheel hub, the spoke portion having three-dimensional, circumferential undulations, and at least three centering pins. Each centering pin is formed as a rib element and is disposed on the spoke portions in zones removed from the regions of stress occurring in the wheel hub during operation of the vehicle.

In one specific embodiment of the invention, the centering pins are disposed in wave troughs of the spoke portion of the wheel hub.

In this embodiment, the centering arrangement includes a flange circumferentially disposed about the wheel hub, as well as centering surfaces associated with the centering pins. The centering pins are separated from the wheel hub by a wave trough. The centering surfaces associated with the centering pins are level with contact surfaces of the wheel hub. These contact surfaces are provided with bores therein for attachment to the central portion of the brake drum. The contact surfaces are located in wave crests of the spoke poriton of the wheel hub.

In another embodiment of the invention, the centering pin is disposed on the central portion of the wheel rim.

A preferred embodiment, illustrated in the accompanying drawings, will now be explained in more detail.

BRIEF DESCRIPTION OF PREFERRED EMBODIMENTS

Figure 1:
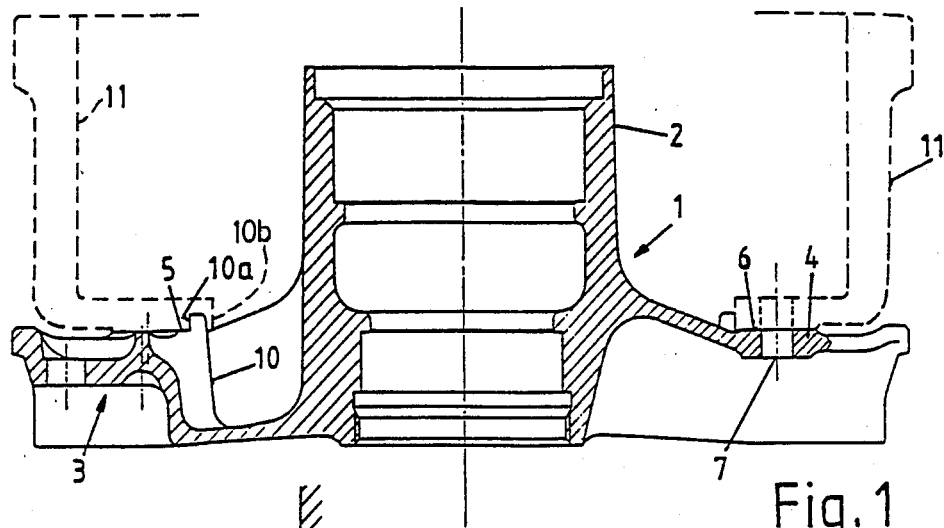
FIG. 1 shows a cross-sectional view of one preferred embodiment of the invention.
Figure 2:
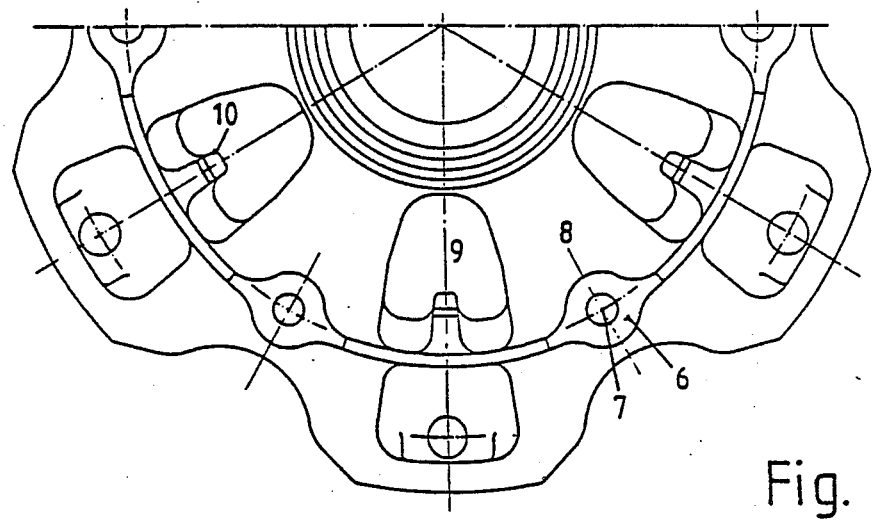
FIG. 2 illustrates a top view of the embodiment shown in FIG. 1.

Referring to FIGS. 1 and 2, a wheel hub 1, formed as a unitary construction, is illustrated. Wheel hub 1 includes a central portion 2, an outer or spoke part 3, and a circumferential flange 4. Spoke part 3 is formed of box-like elements. These box-like elements are arranged about central portion 2 so as to give an undulating or wave-shape in two different planes. Thus, spoke part 3 has a radial, in-plane wave shape as shown in the illustration of FIG. 2. Further, spoke part 3 also has a circumferential wave shape out of the plane of the illustration of FIG. 2. This out-of-plane wave shape emanates from central portion 2 and is best seen in the illustration of FIG. 1. It is this latter, out-of-plane undulation which is of most interest to the present invention.

Referring now to the right side of FIG. 1 and to FIG. 2, up-thrust portions of central portion 2 emanate from the central region of the hub, which up-thrust portions define wave crests of spoke portion 3. The up-thurst portions of central portion 2 terminate in flange 4 which is provided with circumferentially spaced contact surfaces 6. Each contact surface 6 sits atop spoke part 3 and is provided with a bore 7 which is adapted to receive attachment means, such as a screw or bolt, for affixation to brake drum 11. A number of these contact surfaces 6 are provided circumferentially about wheel rim 1.

Referring now to the left side of FIG. 1 and to FIG. 2, alternating with the up-thrust portions of central portion 2 are down-thrust portions emanating from the central region of hub 2. The down-thrust portions define wave troughs 9 of spoke part 3. Each wave trough 9 has a centering pin 10. Each centering pin 10 is formed as a ribbed element. Each centering pin 10 is provided with a trip 10a and a centering surface 5. Centering pin 10, trip 10a and centering surface 5 are designed to align with alignment elements such as element 10b of brake drum 11.

It will be observed that contact surfaces 6 are not disposed in wave troughs 9, but are always provided at the limit of the wave crests 8 in the transitional region between spoke part 3 and flange part 4. It will be further observed that centering pins 10 are disposed in wave troughs 9 of the wheel hub 1. Further, the centering surfaces 5 lie in the same plane as the contact surfaces 6.

The transitional region between centering surfaces 5 and trips 10a are, as a rule, areas susceptible to breakage because of the high stresses that are encountered there. In the present case, however, the centering pins 10, being disposed in wave troughs 9, are remote from the region of high stresses adjacent to contact surfaces 6 and wave crests 8. The stresses referred to herein are those pressures that arise from the assembled portion of the wheel ready for operation which occur especially at the points where the wheel is affixed to the brake drum 11, i.e., in the regions of contact surfaces 6. Thus, the transition regions between centering surfaces 5 and trips 10a are relatively free from such stresses.

Figure 1A:
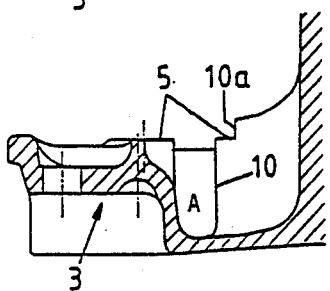
FIG. 1a illustrates a variant of FIG. 1.

Referring now to FIG. 1a, a variant of the embodiment shown in FIG. 1 is illustrated. In this embodiment, the centering pin 10, which is formed as a ribbed element, is disposed immediately adjacent to the central region of central portion 2. A trip 10a is disposed on the side of centering pin 10, and two centering surfaces 5, separated by a wave trough, are associated with each centering pin 10. That portion of centering surface 5 adjacent to trip 10a forms an angular passage with trip 10a. The other portion of the centering pin 5 is a free surface atop spoke part 3 and, as previously mentioned, is separated from the first portion of centering surface 5 by a trough A.

While the invention has been described by reference to specific embodiments, this was for purposes of illustration only, and should not be construed to limit the spirit or the scope of the invention.

I claim:

1. A wheel hub mountable onto a brake drum, the brake drum having alignment elements; said wheel hub comprising:
    a central portion having a central opening;
    an outer undulating circumferential flange integral with said central portion and extending radially therefrom; said outer flange defining a series of crests and troughs; said crests being in contact with said brake drum when said wheel hub is mounted on said brake drum; said troughs being spaced away from said brake drum when said wheel hub is mounted on said brake drum; and
    at least three of said troughs each having a centering pin extending outwardly therefrom and positioned to contact said alignment elements when said wheel hub is mounted on said brake drum.

2. The wheel hub of claim 1 further comprising centering surfaces associated with said centering pins.

3. The wheel hub of claim 2 wherein said centering surfaces and said crests are in the same plane.

4. The wheel hub of claim 2 further comprising a transition zone located between said centering pins and said associated centering surfaces of said centering pins, wherein said centering pins are radially shaped, and said transition zone between said centering pins and their associated centering surfaces are formed with sharp edges.

5. The wheel hub of claim 1 wherein said centering pins are separated from said central portion by a second series of troughs.

* * * * *